US009774236B2

(12) United States Patent
Xu et al.

(10) Patent No.: US 9,774,236 B2
(45) Date of Patent: Sep. 26, 2017

(54) LINEAR VIBRATOR

(71) Applicants:Hongfu Xu, Shenzhen (CN); Zhilin Chai, Shenzhen (CN); Na Wu, Shenzhen (CN)

(72) Inventors: Hongfu Xu, Shenzhen (CN); Zhilin Chai, Shenzhen (CN); Na Wu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 228 days.

(21) Appl. No.: 14/742,799

(22) Filed: Jun. 18, 2015

(65) Prior Publication Data

US 2016/0181900 A1    Jun. 23, 2016

(30) Foreign Application Priority Data

Dec. 23, 2014  (CN) ............... 2014 2 0824091 U

(51) Int. Cl.
| | |
|---|---|
| *H02K 33/00* | (2006.01) |
| *H02K 33/18* | (2006.01) |
| *H02K 33/12* | (2006.01) |
| *H02K 33/04* | (2006.01) |
| *H02K 33/06* | (2006.01) |
| *H02K 33/02* | (2006.01) |
| *H02K 33/16* | (2006.01) |

(52) U.S. Cl.
CPC ............ *H02K 33/18* (2013.01); *H02K 33/02* (2013.01); *H02K 33/04* (2013.01); *H02K 33/06* (2013.01); *H02K 33/12* (2013.01); *H02K 33/16* (2013.01)

(58) Field of Classification Search
CPC ........ H02K 33/02; H02K 33/04; H02K 33/06; H02K 33/12; H02K 33/16; H02K 33/18
See application file for complete search history.

(56) References Cited

U.S. PATENT DOCUMENTS

| | | | | |
|---|---|---|---|---|
| 3,155,854 A | * | 11/1964 | Stam ............... | H02K 33/04 310/29 |
| 3,873,077 A | * | 3/1975 | Jorn ............... | F16F 1/26 267/152 |
| 2009/0267423 A1 | * | 10/2009 | Kajiwara ......... | H02K 33/16 310/36 |

FOREIGN PATENT DOCUMENTS

JP       2007232171 A  *  9/2007

* cited by examiner

*Primary Examiner* — Ramon M Barrera
(74) *Attorney, Agent, or Firm* — Na Xu; IPro, PLLC

(57) ABSTRACT

A linear vibrator includes a stator having a housing including a receiving space, a moveable unit received in the receiving space, a coil attached to one of the stator and the moveable unit, a magnet assembly attached to the other of the stator and the moveable unit, an elastic member having one end connecting to the moveable unit and another end connecting to the stator for suspending the moveable unit in the receiving space, and a damping block located between the moveable unit and the elastic member, and deformable by the elastic member during the vibration of the moveable unit within a predetermined vibration amplitude. A boost force is produced by the damping block for accelerating the moveable unit to return to balanced position.

17 Claims, 5 Drawing Sheets

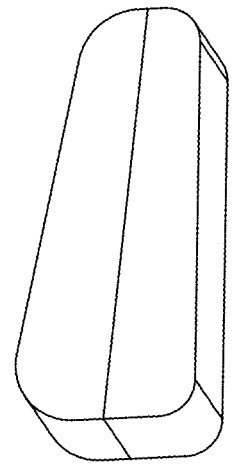 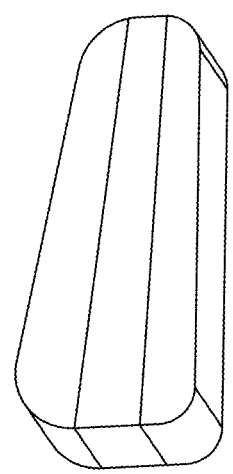
Fig.4a　　　　Fig.4b
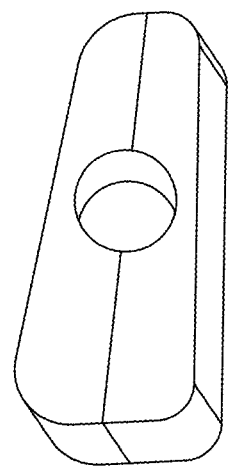 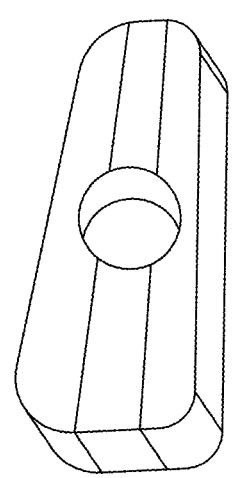
Fig.5a　　　　Fig.5b

LINEAR VIBRATOR

FIELD OF THE INVENTION

The present invention relates to vibrators for generating tactile vibrations, more particularly to a linear vibrator used in a portable consumer electronic device.

DESCRIPTION OF RELATED ART

Consumer products, such as mobile phones and portable multi-media players, generally include vibrators for generating tactile feedback. For example, a mobile phone has a vibrator for generating vibration while a call is called in, and a portable multi-media player has a touch screen having vibrators for getting tactile feedback.

A vibrator has a moving unit moving along a linear direction is called linear vibrator. Linear vibrators are widely used in consumer products and are disclosed in U.S. Pat. No. 6,466,682 B2 issued on Oct. 15, 2002, and U.S. Pat. No. 7,099,489 B2 issued on Aug. 29, 2006. The vibrator is mounted on a mounting surface of a printed circuit board, and the moving unit thereof is actuated to move along a direction perpendicular to the mounting surface. Another linear vibrator includes a moveable unit suspended by a plurality of elastic members for being movable along a direction parallel to a mounting surface of a printed circuit board from which vibration signals are transmitted.

While working, the vibrator needs to be provided with sufficient driving force to drive the movable unit to generate strong vibrations. Greater driving force makes the moveable unit cost more time to return to balanced position. Further, exceeding driving force would drive the moveable unit to strike the housing of the vibrator thereby causing noises.

For avoiding the noises caused by the exceeding amplitude of the moveable unit, a block made of soft material is arranged on the housing or on the moveable unit. When the moveable unit moves beyond the predetermined amplitude, even if the moveable unit strikes the housing, noises could not be produced by virtue of the soft block. However, the related vibrator still has the problem that the moveable unit needs more time to return to balanced position.

Accordingly, an improved linear vibrator capable of avoiding striking noises and shortening return time is desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 4a is an isometric view of a third form of the damping block.

FIG. 4b is an isometric view of a fourth form of the damping block.

FIG. 5a is an isometric view of a fifth form of the damping block.

FIG. 5b is an isometric view of a sixth form of the damping block.

DETAILED DESCRIPTION OF THE EXEMPLARY EMBODIMENT

The present invention will hereinafter be described in detail with reference to an exemplary embodiment.

Figure 1:
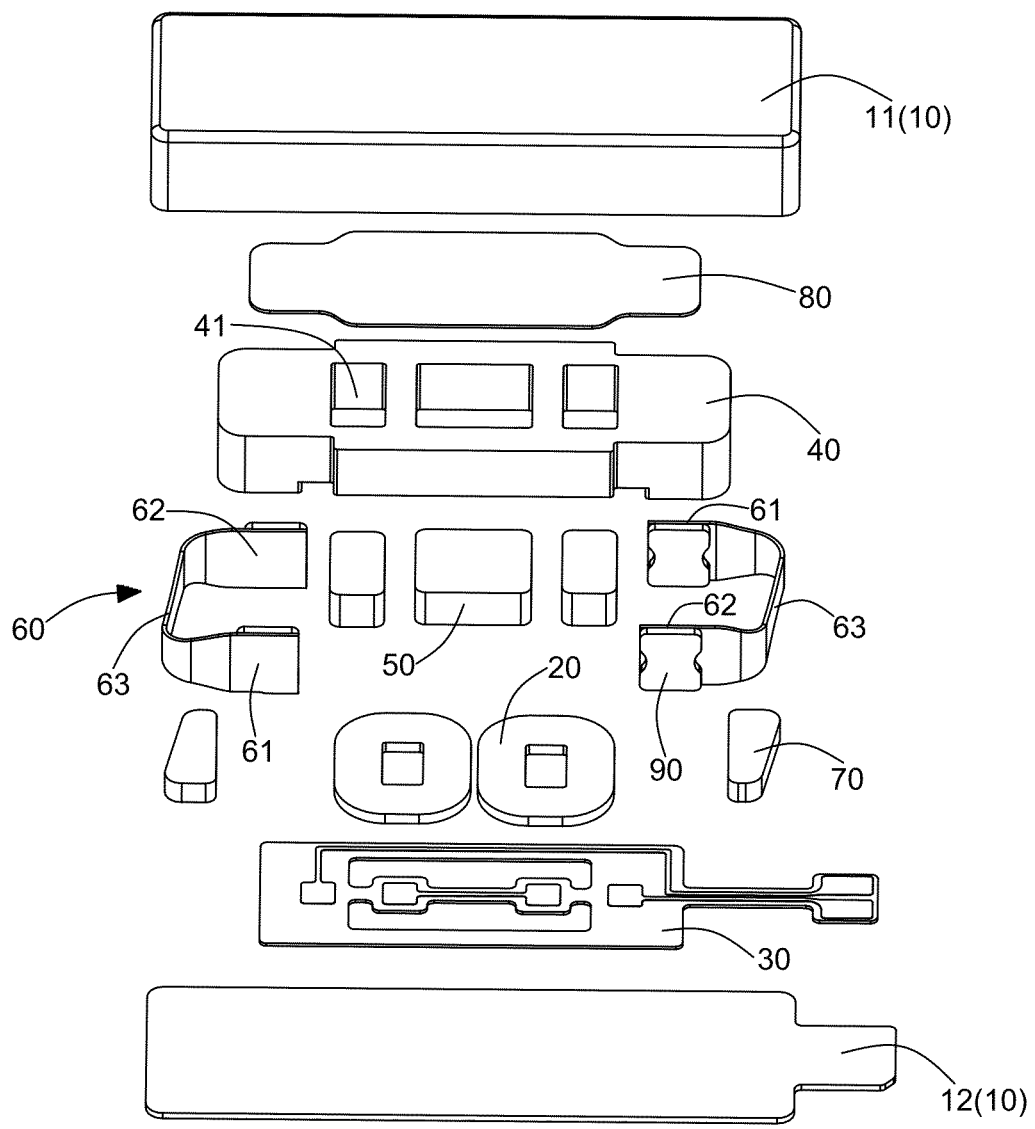
FIG. 1 is an isometric and exploded view of a linear vibrator in accordance with an exemplary embodiment of the present disclosure.
Figure 2:
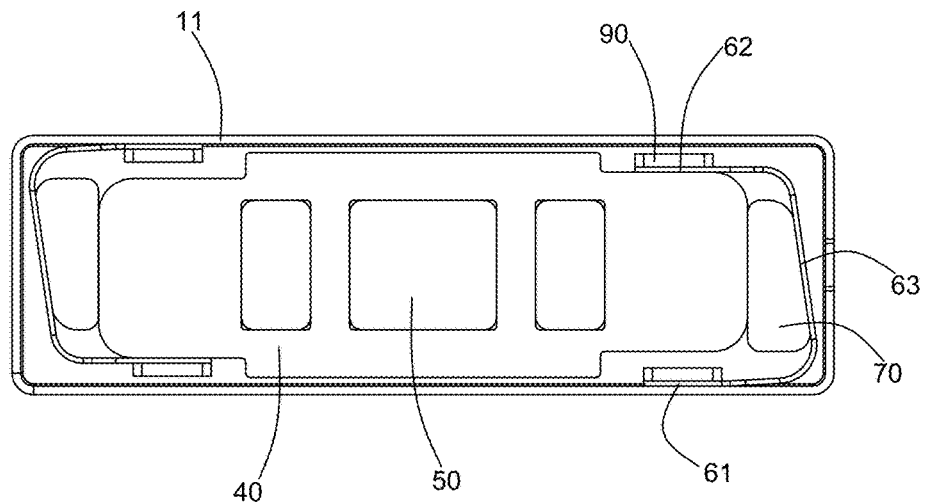
FIG. 2 is a top view of the linear vibrator in FIG. 1, wherein a part of a housing thereof has been removed.

Referring to FIGS. 1-2, a linear vibrator 100 in accordance with an exemplary embodiment of the present disclosure includes a housing 10 providing an accommodating space therein, and a coil 20 received in the accommodating space. The housing 10 comprises a cover 11 and a base 12 engaging with the cover 11. The coil 20 is positioned on the base 12. The vibrator 100 further includes a circuit board 30 attached to the base 12 for providing the coil 20 with driving signals. Here, the housing 10, the coil 20, and the circuit board 30 cooperatively form a stator of the vibrator. Be noted that the stator may include other components as long as the components are relatively fixed.

The linear vibrator 100 further includes a weight 40 having a receiving hole 41, a magnet assembly 50 received in the receiving hole 41, a pole plate 80 attached to the weight 40, and a plurality of elastic members 60 suspending the weight 40 in the accommodating space of the housing 10. The magnet assembly 50 is disposed above the coil 20 and keeps a distance from the coil 20. The magnet assembly 50 may comprise one or more magnets. Here, the weight 40, the magnet assembly 50, and the pole plate 80 cooperatively form a moveable unit (rotor) of the linear vibrator 100. In fact, the moveable unit may comprise other components as long as the other components are moveable with respect to the stator. Alternatively, the coil 20 could be mounted in the receiving hole of the weight, and the magnet assembly could be mounted on the base 12.

The linear vibrator 100 further includes a damping block 70 arranged between the moveable unit and the elastic member 60. The damping block 70 is capable of being pressed by the elastic member 60 and the moveable unit. The linear vibrator 100 is provided with a predetermined vibration amplitude P that is designed by actual requirements and is determined by the electro-magnetic force generated by the coil and the magnet assembly. Once the linear vibrator is manufactured, the predetermined vibration amplitude is determined. If the coil is provided with exceeding current, the amplitude of the moveable unit must be beyond the predetermined vibration amplitude. Or, if the linear vibrator falls, the moveable unit would also move beyond the predetermined vibration amplitude. It is understood that the predetermined vibration amplitude ensures that the moveable unit can't strike the housing. The damping block 70 is forced to be deformable elastically by the elastic member 60 and the moveable unit within the predetermined vibration amplitude.

The elastic member 60 includes a first elastic arm 61 connecting to the cover 11, a second elastic arm 62 connecting to the moveable unit, and a third elastic arm 63 connecting the first elastic arm to the second elastic arm 62. The damping block 70 is arranged between the moveable unit and the third elastic arm 63. During the vibration of the moveable unit, the damping block 70 is pressed by the third elastic arm 63 and the moveable unit.

Figure 2A:
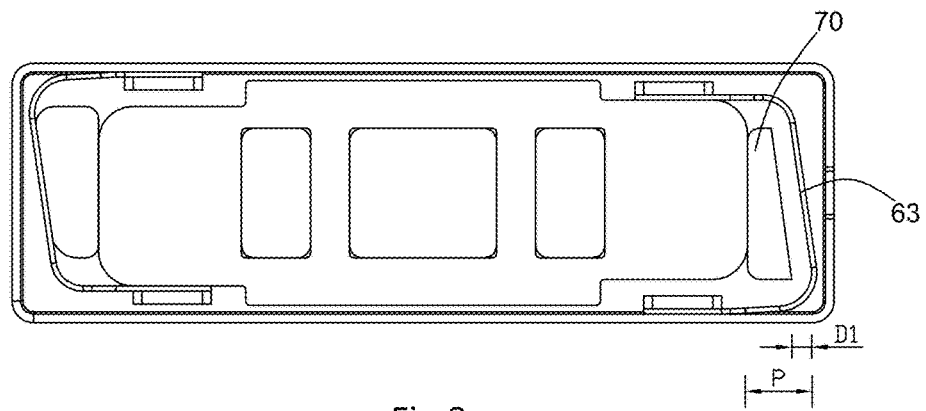
FIGS. 2a-2c are illustrations of variable arrangements of a damping block and an elastic member of the linear vibrator.

The damping block 70 could be attached to the moveable unit, and keeps a distance from the third elastic arm 63, wherein the distance between the damping block 70 and the third elastic arm 63 is smaller than the predetermined vibration amplitude. As shown in FIG. 2*a*, the damping block 70 is attached to the moveable unit and forms a distance D1 from the third elastic arm 63. The distance D1 is smaller than the predetermined vibration amplitude P.

Figure 2B:
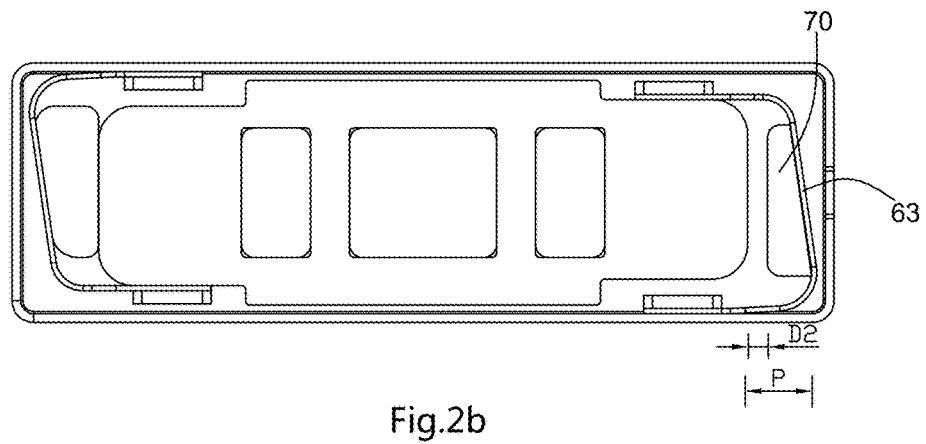

The damping block 70 could be also attached to the third elastic arm 63, and keeps a distance from the moveable unit, wherein the distance between the damping block 70 and the moveable unit is smaller than the predetermined vibration amplitude. As shown in FIG. 2*b*, the damping block 70 is attached to the third elastic arm 63 and forms a distance D2 from the moveable unit. The distance D2 is smaller than the predetermined vibration amplitude P.

Alternatively, referring to FIG. 2, the damping block 70 could be attached to the moveable unit and the third elastic arm 63, i.e. sandwiched between the third elastic arm and the moveable unit. In this case, once the moveable unit moves, the damping block will be pressed and deform elastically.

Figure 2C:
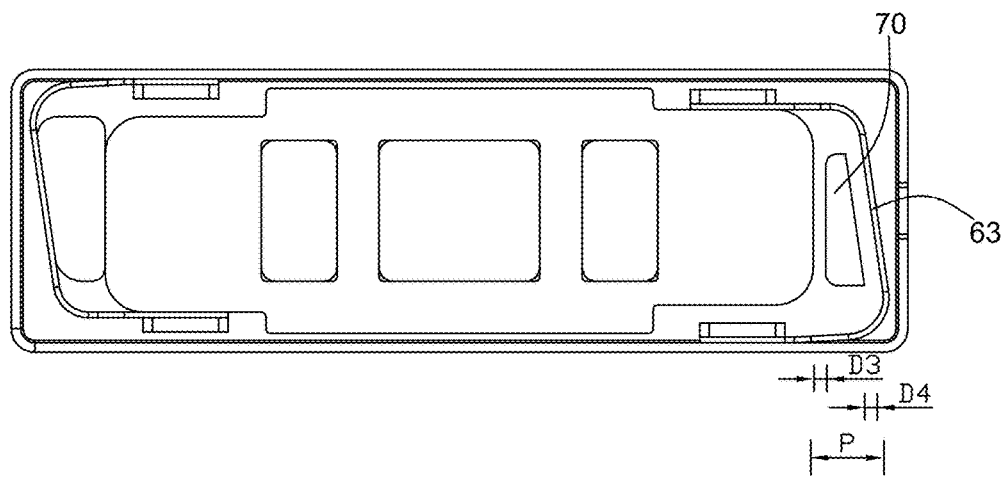

Referring to FIG. 2*c*, the damping block 70 could be fixed on the housing, and keeps a first distance D3 from the moveable unit, and a second distance D4 from the third elastic arm 63. The summation of the first and second distances is smaller than the predetermined vibration amplitude P.

Figures 3A, 3B:
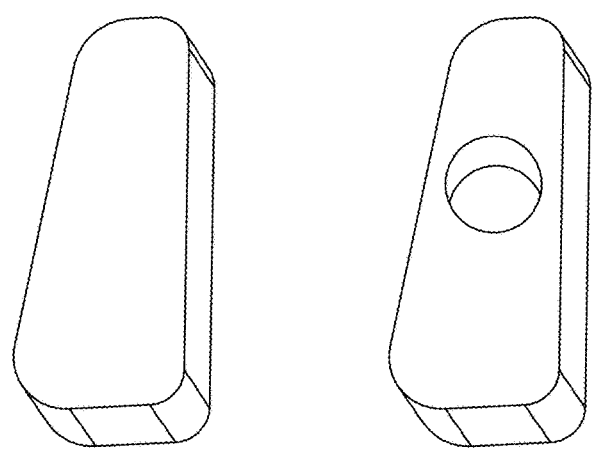
FIG. 3a is an isometric view of a first form of a damping block of the linear vibrator.
FIG. 3b is an isometric form of a second form of the damping block.

The damping block 70 can be designed according to actual requirements and may have variable forms or shapes. For example, as shown in FIG. 3*a*, the damping block 70 is a solid structure. As shown in FIG. 3*b*, the damping block 70 is similar to the one in FIG. 3*a* but further includes a though hole 71 therein for adjusting the damping performance. As shown in FIG. 4*a*, the damping block 70 could be made of two different materials having different stiffness, and as shown in FIG. 4*b*, the damping block 70 is made of three different materials having different stiffness. Also, the damping block 70 in FIG. 5*a* is similar to the one in FIG. 4*a* but further includes a through hole therein. And the damping block 70 in FIG. 5*b* defines a through hole based on the structure in FIG. 4*b*. Different materials to form the damping block is used to adjust the damping performance thereof.

The damping block 70 could be formed by a plurality of parts having different stiffness, i.e. the damping block 70 is formed by relatively softer parts and relatively harder parts. And the stiffness of the parts could be increased gradually, or decreased gradually. In fact, according to actual requirements, the stiffness of the parts could be variable increased and then decreased, or variable randomly.

The material of the damping block 70 can be selected from but not limited to sponge, silicone, foam, fiber. It is optional that the softer part of the damping block 70 is connected to the moveable unit, the elastic member, or the housing.

The damping block used in the linear vibrator elastically deforms during the vibration of the moveable unit within the predetermined vibration amplitude. During the vibration, the damping block is pressed and released repeatedly for generating damping performance. Further, while the damping block is pressed or released, a boost force is produced by the damping block for accelerating the moveable unit to return to balanced position. Even if the moveable unit exceeds the predetermined vibration amplitude, the damping block will also serve as a limitation or cushion for avoiding striking noises.

Referring back to FIG. 1, the linear vibrator 100 further includes a gasket 90 attached to the first elastic arm 61 or to the second elastic arm 62 for enhancing the connection stability between the elastic member and the moveable unit.

Figure 6:
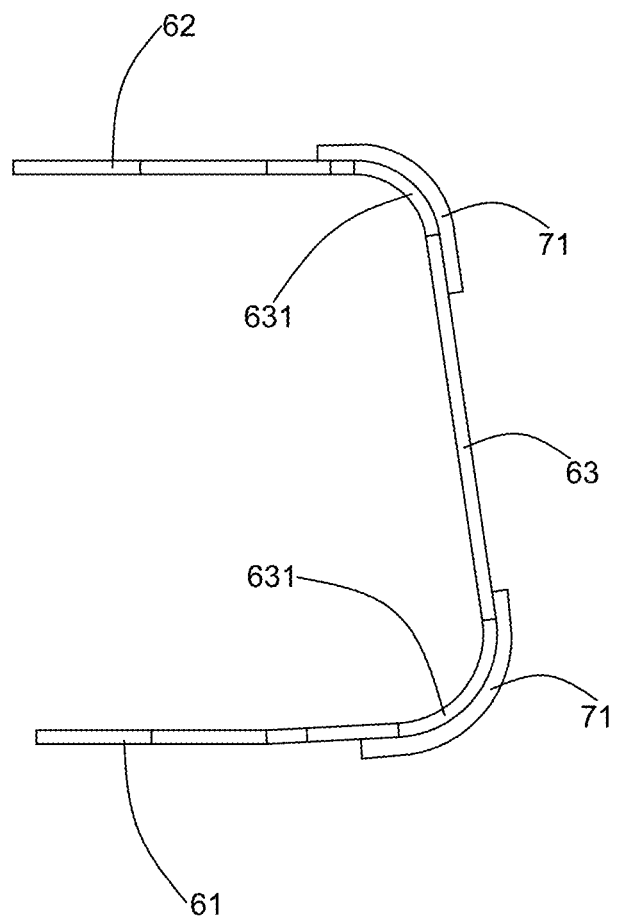
FIG. 6 is an illustration of an elastic member of the linear vibrator.

Referring to FIG. 6, the third elastic arm 63 includes a pair of deforming parts 631 each being attached with a damping member 71. The damping member 71 is formed by adhesive layer, PU (Polyurethane), or silicone. The damping member 71 is used for decreasing the compliance of the elastic member 60.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibrator, comprising:
   a stator having a housing including a receiving space;
   a moveable unit received in the receiving space;
   a coil attached to one of the stator and the moveable unit;
   a magnet assembly attached to the other of the stator and the moveable unit;
   an elastic member having one end connecting to the moveable unit and another end connecting to the stator for suspending the moveable unit in the receiving space;
   a damping block located between the moveable unit and the elastic member, the damping block being deformable by the elastic member and the moveable unit during the vibration of the moveable unit within a predetermined vibration amplitude; wherein a distance is formed from the damping block to the moveable unit and/or the elastic member, and the distance is smaller than the predetermined vibration amplitude.

2. The linear vibrator as described in claim 1, wherein the damping block is solid.

3. The linear vibrator as described in claim 1, wherein the damping block has a through hole therein for adjusting the damping performance.

4. The linear vibrator as described in claim 1, wherein the damping block is made of different materials having different stiffness.

5. The linear vibrator as described in claim 1, wherein the elastic member includes a first elastic arm connecting to the housing, a second elastic arm connecting to the moveable unit, and a third elastic arm connecting the first elastic arm to the second elastic arm, the damping block is arranged between the third elastic arm and the moveable unit.

6. The linear vibrator as described in claim 5, wherein the damping block is attached to the moveable unit and keeps a distance from the third elastic arm, the distance between the damping block and the third elastic arm is smaller than the predetermined vibration amplitude.

7. The linear vibrator as described in claim 5, wherein the damping block is attached to the third elastic arm and keeps a distance from the moveable unit, the distance between the damping block and the moveable unit is smaller than the predetermined vibration amplitude.

8. The linear vibrator as described in claim 5, wherein the damping block is fixed to the stator, keeping a first distance from the third elastic arm and a second distance from the moveable unit, a summation of the first distance and the second distance is smaller than the predetermined vibration amplitude.

9. The linear vibrator as described in claim 5 further comprising a gasket disposed on the first elastic arm or the second elastic arm.

10. The linear vibrator as described in claim 5, wherein the third elastic arm comprises a deforming part and a damping member attached to the deforming part.

11. A linear vibrator, comprising:
a stator;
a moveable unit being moveable relative to the stator within a predetermined vibration amplitude;
an elastic member for supporting the moveable unit and providing the moveable unit with elastic forces to vibrate repeatedly;
a damping block located between the moveable unit and the elastic member, and deformable elastically corresponding to an elastic deformation of the elastic member during the vibration of the moveable unit within the predetermined vibration amplitude; wherein a distance is formed from the damping block to the moveable unit and/or the elastic member, and the distance is smaller than the predetermined vibration amplitude.

12. The linear vibrator as described in claim 11, wherein the damping block has a through hole therein for adjusting the damping performance.

13. The linear vibrator as described in claim 11, wherein the damping block is made of different materials having different stiffness.

14. The linear vibrator as described in claim 11, wherein the elastic member includes a first elastic arm connecting to the stator, a second elastic arm connected to the moveable unit, and a third elastic arm connecting the first elastic arm to the second elastic arm.

15. The linear vibrator as described in claim 14, wherein the damping block is attached to the moveable unit and keeps a distance from the third elastic arm, the distance between the damping block and the third elastic arm is smaller than the predetermined vibration amplitude.

16. The linear vibrator as described in claim 14, wherein the damping block is attached to the third elastic arm and keeps a distance from the moveable unit, the distance between the damping block and the moveable unit is smaller than the predetermined vibration amplitude.

17. The linear vibrator as described in claim 14, wherein the damping block is fixed to the stator, keeping a first distance from the third elastic arm and a second distance from the moveable unit, a summation of the first distance and the second distance is smaller than the predetermined vibration amplitude.

* * * * *